April 5, 1927.
B. P. REMY
1,623,270
MAGNETO
Filed Dec. 1, 1925
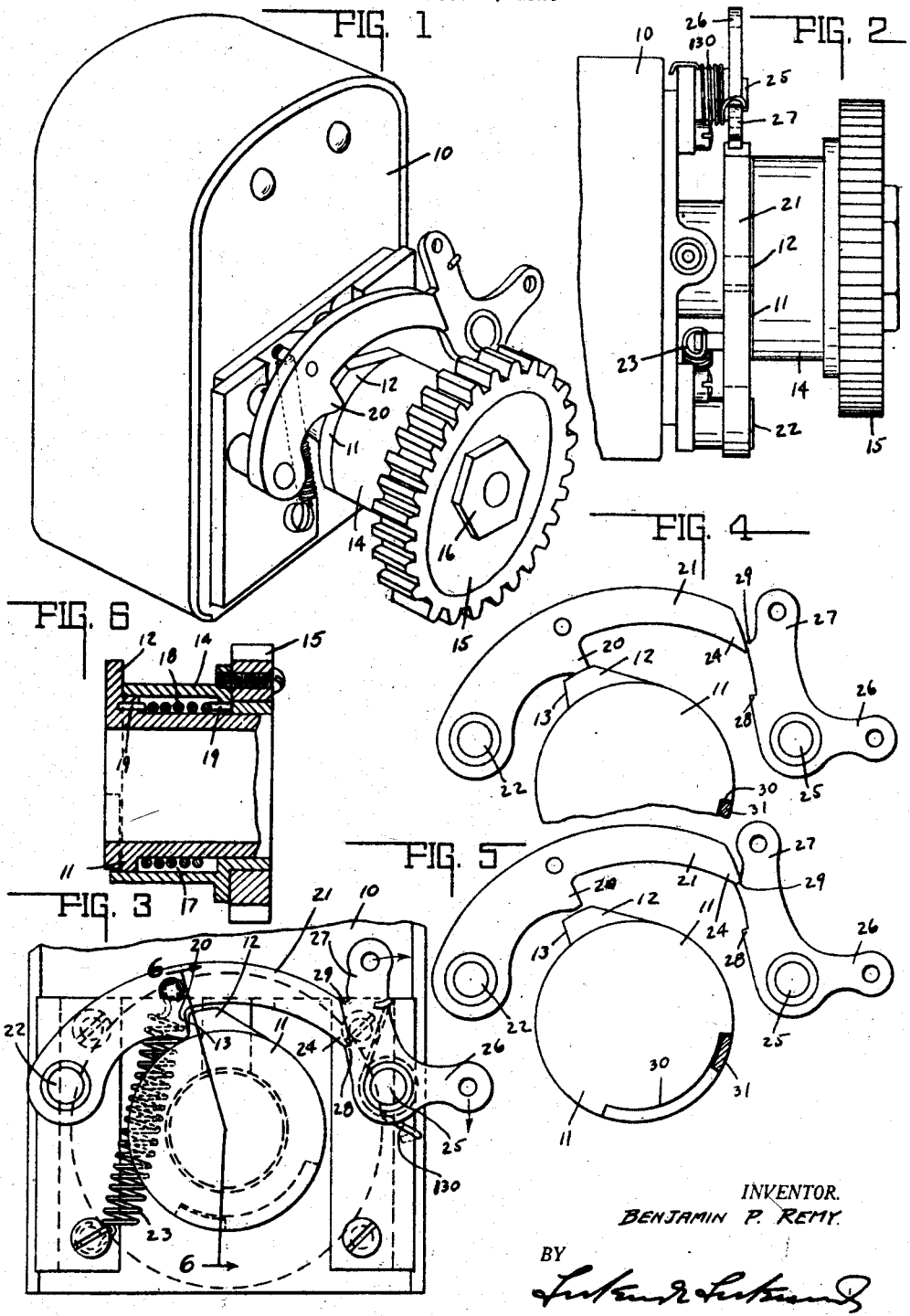
INVENTOR.
BENJAMIN P. REMY.
BY
ATTORNEYS.

Patented Apr. 5, 1927.

1,623,270

UNITED STATES PATENT OFFICE.

BENJAMIN P. REMY, OF INDIANAPOLIS, INDIANA.

MAGNETO.

Application filed December 1, 1925. Serial No. 72,524.

This invention relates to a simplified arrangement for an impulse starter and magneto.

The chief object of the invention is to simplify the arrangement whereby a magneto is adapted to operate as an impulse starter upon starting and thereafter operate as a magneto when the power unit has attained sufficient speed to operate the magneto continuously.

The chief feature of the invention consists in the simplification and reduction in number of parts whereby the device is automatically operable to function as an impulse starter and when the power unit has attained the requisite speed automatically becomes disengaged and is maintained in the non-engaging position.

The full nature of the invention will be understood from the accompanying drawings and the following description and claims:

Fig. 1 is a perspective view of a magneto, power drive connected therewith and the impulse actuated parts in the retarded position. Fig. 2 is a top plan view thereof. Fig. 3 is an end view of the before mentioned parts with the gear removed and shown dotted. Fig. 4 is a view similar to Fig. 3 of the operative parts in the releasing or current generating position. Fig. 5 is a view of the same parts in a non-engaging position and showing the non-engaging part maintained in such position whereby the magneto may function in its customary manner. Fig. 6 is a longitudinal sectional view of the connection between the driving and driven members and is taken on line 6—6 of Fig. 3 and in the direction of the arrows.

In the drawings 10 indicates a magneto construction of any suitable or conventional type having a rotor and stator, the rotor including a shaft to which is secured a sleeve 11. The sleeve 11 includes a peripheral projection 12 having the combination stop and cam releasing face 13. Concentric with the sleeve 11 or driven shaft is a driving shaft 14 which supports a driving pinion 15 suitably secured thereto, the entire assembly being secured together by the nut or retainer 16. The two shafts or concentric sleeves 11 and 14 form a chamber 17 therebetween in which is mounted a coil spring 18 having its ends respectively connected to said shafts, whereby said shafts have relative rotational movement for but a limited amount, to wit, if sleeve 11 is held stationary the spring 18 is coiled and thus as the coiling of spring 18 increases the tendency or force exerted by the shaft or sleeve 14 increases to drive or rotate shaft or sleeve 11 therewith.

Cooperating with the projection or stop 12 is a catch 20 which is normally operative to prevent rotation of sleeve 11 until a predetermined time such as when the spring 18 has been sufficiently coiled. In this event when the force exerted by the driving shaft 14 is sufficient, the face 13 of the stop actually acts as a cam and moves the catch out of catching position to permit continued rotation of sleeve or shaft 11 with the sleeve or shaft 14. This immediate continued rotation is at a high rate or impulsive in character and therefore the magneto operates as an impulse starter.

For positive predetermined action, the foregoing construction includes an arcuate notch or groove 30 in sleeve shaft 11. A projecting tongue 31 on sleeve shaft 14 is seatable in the elongated groove. When the tongue engages the end wall of the groove the two shafts are positively connected. Simultaneously with this relative movement spring 17 is coiled. Continued rotation causes cam 13 to elevate catch 20 and release the rotor shaft to the impulsive driving of spring 17.

The catch 20 is a part of the movably supported member 21 pivotally supported as a lever at 22. A spring 23 normally tends to force the catch into catching position and opposes movement of the cam 12 to force the catch out of catching position. The lever 21 is extended and has a toothed end 24. Pivotally supported at 25 adjacent said end is a bell crank lever having one arm 26 and another arm 27, either of which arms may be connected to controlling mechanism. The bell crank lever includes a pair of rests or shoulders 28 and 29. The shoulder 28 normally engages the toothed end 24 and thus the lever 21 although yieldingly and pivotally mounted, is restrained from movement toward the stop and cam or shafting beyond the limit defined by said shoulder. A spring 130 normally maintains the bell crank lever having the aforesaid supporting restraining shoulders in engagement with the lever 27. The shoulder 29, see Fig. 5, is adapted to maintain lever 21 in the non-catching position and the same continues to maintain the same after the toothed end 24 has once been seated upon shoulder 29.

The device is automatic in its action, to-wit, the movement of lever 21 to seat on shoulder 29, and this only occurs when the shaft 14 has sufficient angular speed to automatically tilt said lever 21 upon its pivot 22 for such locking engagement. Thereafter the two shafts 11 and 14 rotate as one, although yieldingly connected together and the magneto operates as the customary magneto and not as one of the impulse type. If the power unit is stopped and it is desired to start the same the bell crank lever, either through arm 26 or 27, is tilted to release the lever 21 from the shoulder 29 and the spring 23 projects the catch 20 into the path of the combination stop and cam 12 for operation of the magneto as an impulse starter. Thereupon the cycle of operation is repeated.

The invention claimed is:

1. In a magneto, the combination of a rotor shaft, a driving shaft therefor flexibly connected thereto, said shafts having limited relative rotational movement, a combined cam and stop carried by the rotor shaft, a movably mounted catch for said combination cam and stop yieldingly engaging the same but forcibly and automatically movable into stop releasing position by the latter for permitting impulsive rotation of the rotor shaft by the flexible connection when the catch and combination stop and cam have been disassociated, and a second stop for limiting movement of the catch toward the combination cam and stop but permitting catch and combination cam and stop cooperation.

2. In a magneto, the combination of a rotor shaft, a driving shaft therefor flexibly connected thereto, said shafts having limited relative rotational movement, a combined cam and stop carried by the rotor shaft, a movably mounted catch for said combination cam and stop yieldingly engaging the same but forcibly and automatically movable into stop releasing position by the latter for permitting impulsive rotation of the rotor shaft by the flexible connection when the catch and combination stop and cam have been disassociated, and a second stop selectively engageable by the catch for selectively limiting the movement of the catch toward the combination stop and cam but permitting cooperation therebetween, or for maintaining the catch in non-catching position.

3. In a magneto, the combination of a rotor shaft, a driving shaft therefor flexibly connected thereto, said shaft having limited relative rotational movement, a combined cam and stop carried by the rotor shaft, a movably mounted catch for said combination cam and stop yieldingly engaging the same but forcibly and automatically movable into stop releasing position by the latter for permitting impulsive rotation of the rotor shaft by the flexible connection when the catch and combination stop and cam have been disassociated, a yieldingly mounted member constantly engaging the catch for limiting the movement of said yieldingly mounted catch toward the combination cam and stop but permitting cooperation therebetween, or for maintaining said catch in non-catching position when said catch releasing movement exceeds a predetermined amount determinable by predetermined driving shaft speed, and means for actuating said yieldingly mounted member to release said catch from the last mentioned position into the first mentioned position, said catch being automatically movable from one to the other by reason of said yielding mounting.

In witness whereof, I have hereunto affixed my signature.

BENJAMIN P. REMY.